US011987334B2

United States Patent
Aichele, Jr. et al.

(10) Patent No.: US 11,987,334 B2
(45) Date of Patent: May 21, 2024

(54) OUTBOARD MOTOR SUPPORT DEVICE

(71) Applicant: EPCO Products Inc, Fort Wayne, IN (US)

(72) Inventors: Fredric J. Aichele, Jr., Fort Wayne, IN (US); Nicholas B. Krontz, Columbia City, IN (US); Jason C. Kabot, Fort Wayne, IN (US); Robert D. Rohr, LaOtto, IN (US)

(73) Assignee: EPCO Products Inc, Fort Wayne, IN (US)

(*) Notice: Subject to any disclaimer, the term of this patent is extended or adjusted under 35 U.S.C. 154(b) by 424 days.

(21) Appl. No.: 17/141,538

(22) Filed: Jan. 5, 2021

(65) Prior Publication Data
US 2022/0212766 A1 Jul. 7, 2022

(51) Int. Cl.
*B63H 20/36* (2006.01)
*B60P 3/10* (2006.01)
(Continued)

(52) U.S. Cl.
CPC ............. *B63H 20/36* (2013.01); *B63H 20/02* (2013.01); *B60P 3/1066* (2013.01); *B63H 20/10* (2013.01)

(58) Field of Classification Search
CPC ........ B63H 20/36; B63H 20/10; B63H 20/02; B63H 20/06; B63H 21/305; B60P 3/1066
(Continued)

(56) References Cited

U.S. PATENT DOCUMENTS

| 1,389,712 A | 9/1921 | Thompson et al. |
| 2,127,744 A * | 8/1938 | Linthwaite ............. B63H 20/12 248/642 |

(Continued)

FOREIGN PATENT DOCUMENTS

| DE | 19819173 A1 * | 11/1999 | ............ B60P 3/1033 |
| DE | 102007035655 | 1/2009 | |

(Continued)

OTHER PUBLICATIONS

Prior Disclosure Photo 1.
Prior Disclosure Photo 2.
Prior Disclosure Photo 3.

*Primary Examiner* — Taylor Morris
(74) *Attorney, Agent, or Firm* — Faegre Drinker Biddle and Reath LLP

(57) ABSTRACT

An outboard motor support device includes a transom connection mechanism, a pivot joint, and a motor support. The transom connection mechanism engages directly with a transom bracket to maximize stability and is configured to provide a consistently correct angular orientation of the motor support relative to the motor during use. In particular, the pivot joint adjustably aligns to the motor is a desired orientation during assembly to ensure a firm and "nested" engagement with the lower unit of the motor in the motor support. The motor support can be designed to fit specific motors, allowing for maximum stability and maximum surface area contact when properly aligned and engaged with the motor. The present outboard motor support device is formed as a single unit that provides vertical support as well as horizontal stabilization to the motor during transit, thereby also preserving the transom brackets and tilt/trim mechanism of the motor.

20 Claims, 13 Drawing Sheets

(51) Int. Cl.
*B63H 20/02* (2006.01)
*B63H 20/10* (2006.01)

(58) Field of Classification Search
USPC .......................................................... 248/640
See application file for complete search history.

(56) References Cited

U.S. PATENT DOCUMENTS

| | | | | |
|---|---|---|---|---|
| 2,138,600 | A | * | 11/1938 | Harmon ................. B63H 20/08 248/641 |
| 2,498,348 | A | * | 2/1950 | Thompson, Jr. ......... B63H 1/14 415/217.1 |
| 2,757,888 | A | * | 8/1956 | Branstrator ............ B63H 20/14 248/641 |
| 2,782,052 | A | * | 2/1957 | Albrecht .................. B60P 3/10 224/406 |
| 2,901,267 | A | | 8/1959 | Holsclaw |
| 2,934,303 | A | | 4/1960 | Conrad |
| 2,939,670 | A | | 6/1960 | Anderson |
| 2,967,687 | A | * | 1/1961 | Glusic .................... B63H 20/12 248/642 |
| 3,018,989 | A | | 1/1962 | Gossett |
| 3,032,304 | A | * | 5/1962 | Machlan ................ B63H 20/06 248/641 |
| 3,116,710 | A | * | 1/1964 | Cass ...................... B63H 20/10 440/61 R |
| 3,139,853 | A | * | 7/1964 | McCarthy ............ B63H 20/007 440/66 |
| 3,606,505 | A | * | 9/1971 | Satterthwaite et al. ..................... F16C 35/02 384/98 |
| 3,693,576 | A | | 9/1972 | Driscoll |
| 3,749,046 | A | | 7/1973 | Ow |
| 3,941,344 | A | | 3/1976 | Paterson |
| 3,952,986 | A | | 4/1976 | Wells |
| 4,002,362 | A | * | 1/1977 | Sears ...................... B60R 19/44 428/31 |
| 4,125,236 | A | | 11/1978 | Landwerlen |
| 4,331,431 | A | | 5/1982 | Estes |
| 4,406,634 | A | * | 9/1983 | Blanchard ............. B63H 20/12 248/642 |
| 4,438,899 | A | | 3/1984 | Perkins et al. |
| 4,501,561 | A | | 2/1985 | Speelman |
| D282,144 | S | | 1/1986 | Speelman |
| 4,650,427 | A | | 3/1987 | Huchinson |
| 4,651,964 | A | | 3/1987 | Kendrick |
| 4,685,888 | A | | 8/1987 | Brewer |
| 4,687,448 | A | * | 8/1987 | Peirce ................... B63H 20/06 440/61 J |
| 4,828,186 | A | | 5/1989 | Weiss |
| 4,842,239 | A | | 6/1989 | Kinsey et al. |
| 4,911,395 | A | | 3/1990 | Jones, Jr. |
| 4,998,496 | A | * | 3/1991 | Shaw, III ............... B63H 20/36 150/157 |
| 5,021,016 | A | | 6/1991 | Currey |
| 5,031,842 | A | | 7/1991 | Mohr |
| 5,052,956 | A | | 11/1991 | Binversie et al. |
| 5,102,358 | A | | 4/1992 | Binversie et al. |
| 5,178,568 | A | | 1/1993 | Binversie et al. |
| 5,188,549 | A | * | 2/1993 | Kozubski ............... B63H 20/10 440/63 |
| 5,292,270 | A | * | 3/1994 | Tucker ................... F16C 17/14 403/312 |
| 5,393,251 | A | | 2/1995 | Gilbert |
| 5,525,082 | A | | 6/1996 | Lee et al. |
| 5,609,506 | A | | 3/1997 | Williams, Jr. |
| 5,647,781 | A | | 7/1997 | Johnson, Sr. |
| D392,245 | S | | 3/1998 | Johnson, Sr. |
| 5,775,669 | A | | 7/1998 | Huggins et al. |
| 5,795,202 | A | | 8/1998 | Williams |
| 5,868,591 | A | * | 2/1999 | Kleeman ................. B63J 99/00 114/172 |
| 5,888,109 | A | * | 3/1999 | Poll ........................ B63H 20/10 440/55 |
| 6,076,796 | A | | 6/2000 | Huggins et al. |
| 6,179,673 | B1 | * | 1/2001 | Leroux .................. B63H 20/36 440/71 |
| 6,447,350 | B2 | | 9/2002 | Thompson et al. |
| 6,494,431 | B1 | * | 12/2002 | McCoy .................. B63H 20/10 248/640 |
| 6,513,782 | B2 | | 2/2003 | Fischer |
| 6,540,571 | B1 | | 4/2003 | Tolbert |
| RE39,414 | E | | 11/2006 | Poll |
| 7,278,893 | B1 | | 10/2007 | Frantz |
| 7,335,073 | B1 | | 2/2008 | Christian |
| 7,556,545 | B2 | | 7/2009 | Draghici |
| D625,334 | S | | 10/2010 | Gouge |
| 8,096,521 | B1 | | 1/2012 | Smith |
| 8,221,175 | B2 | * | 7/2012 | Mynster ................. B63B 34/05 114/144 R |
| 8,596,698 | B1 | * | 12/2013 | Scriven .................... B65G 7/12 440/6 |
| 9,145,194 | B2 | * | 9/2015 | Marks ..................... B63H 20/36 |
| 9,701,383 | B1 | * | 7/2017 | Stuber ..................... B63H 20/06 |
| 10,654,397 | B2 | * | 5/2020 | Huddleston ........... B60P 3/1066 |
| 10,850,819 | B2 | * | 12/2020 | Wiatrowski ........... B63H 20/06 |
| 11,312,459 | B2 | * | 4/2022 | Jordan .................... B63H 20/06 |
| 2008/0029683 | A1 | * | 2/2008 | Draghici ............... B60P 3/1066 248/640 |
| 2008/0169404 | A1 | | 7/2008 | Smith |
| 2010/0127150 | A1 | * | 5/2010 | Wakeham .............. B63H 20/10 248/642 |
| 2013/0090026 | A1 | * | 4/2013 | Orselli ..................... B63B 7/087 440/53 |
| 2016/0297346 | A1 | * | 10/2016 | Huddleston ........... B60P 3/1033 |
| 2019/0263313 | A1 | * | 8/2019 | Huddleston ........... B60P 3/1033 |
| 2019/0271414 | A1 | * | 9/2019 | Bernstetter .............. F16L 3/13 |
| 2020/0262535 | A1 | * | 8/2020 | Jordan .................... B63H 20/06 |

FOREIGN PATENT DOCUMENTS

GB 2028244 A * 3/1980 ............ B63H 20/10
WO WO-2019173870 A1 * 9/2019 ............ B60P 3/1066

* cited by examiner

OUTBOARD MOTOR SUPPORT DEVICE

STATEMENT REGARDING PRIOR DISCLOSURE BY THE INVENTOR OR A JOINT INVENTOR UNDER 37 C.F.R. 1.77(B)(6)

An outboard motor support device, in accordance with the present disclosure and jointly invented by the present inventors, was publicly shown at the BASSMASTER CLASSIC 2020 IN BIRMINGHAM, ALABAMA ON Mar. 6-8, 2020. Prior Disclosure Photos 1-3 showing this outboard motor support device are provided on a concurrently filed Information Disclosure Statement. In Prior Disclosure Photo 3, features of the outboard motor support device described herein are shown with reference numerals corresponding to the reference numerals used in the present application for identical features shown and described in the Detailed Description and drawings.

BACKGROUND

1. Technical Field

The present disclosure relates generally to outboard motor support devices for marine vehicles and, more specifically, to an outboard motor support device which provides support to outboard motors during trailering and transportation of marine vehicles.

2. Description of the Related Art

Many marine vehicles, such as boats with outboard motors, include a transom to support the outboard motor via brackets and hydraulic tilt/trim structures. The transom is typically formed as a rigid surface on the stern of a boat to which motor support structures are mounted during use and transport. During trailering and transport, with the motor in a raised or tilted position, the motor requires additional support to prevent the motor, the hydraulic tilt and trim mechanism, and transom from being damaged due to movement of the motor such as via bouncing and vibration, for example. Many outboard marine motors are very expensive, heavy, and powerful units that employ complex hydraulic systems for both steering and tilt control during use and transport. As such, any stress on the hydraulic systems of an outboard motor can potentially cause severe structural damage, as well as undesired aesthetic damage.

One known outboard motor support device includes a rigid, rod-type structure attached to the transom brackets at one end, which contacts the lower unit of the outboard motor at its opposite end. During installation, a user mounts the support device to the transom and raises the other end while lowering the motor via the trim mechanism. As the motor is lowered, a front-facing surface of the lower unit of the motor engages the support end of the motor support device. The motor then rests by gravity on the support device, with motor load transferred via the device to the transom. Disadvantageously, this and similar devices typically only provide vertical gravitational support, with little or no resistance to lateral movements of the motor during trailering. Also, the device may become dislodged during trailering and/or may scratch or mar the lower unit of the motor.

In order to more fully protect the motor, transom, and the hydraulic tilt/trim mechanism, steering clips may be used along with devices such as that described above, which are installed on the hydraulic pistons of the steering mechanism to restrain lateral movement during trailering. These steering clips are typically sold separately from motor support devices, are assembled separately, and function separately as "add-on" devices in addition to the primary motor support. Disadvantageously, use of separate steering clips requires additional installation steps for supporting the motor during trailering, adding undesired complexity to the operation of completely securing the motor during trailering.

What is needed is an improvement over the foregoing.

SUMMARY

The present disclosure provides an outboard motor support device including a transom connection mechanism, a pivot joint, and a motor support. The transom connection mechanism engages directly with a transom bracket to maximize stability and is configured to provide a consistently correct angular orientation of the motor support relative to the motor during use. In particular, the pivot joint adjustably aligns the motor support device to the motor in a desired orientation during installation to ensure a firm and "nested" engagement with the lower unit of the motor within the motor support. The motor support can be designed to fit specific motors, allowing for maximum stability and maximum surface area contact when properly aligned and engaged with the motor. The present outboard motor support device advantageously provides robust vertical support as well as horizontal stabilization to the motor during transit, thereby also preserving the transom brackets and tilt/trim structure of the motor.

The transom connection mechanism may further include two plunger pin mechanisms disposed parallel to one another. Each plunger pin mechanism has an attachment point on each of its ends, and the spatial arrangement of the attachment points corresponds to standard pre-drilled holes in a transom bracket. The two parallel plunger pin mechanisms provide four corresponding attachment points, which cooperate with the pivot mechanism to create a four-bar linkage when the device is connected to a transom bracket.

The pivot joint works in conjunction with the connection mechanism to ensure a desired angle, orientation and position for the motor support as it rises to meet and engage with the motor. When so engaged, the motor is both vertically and horizontally supported and stabilized by firm engagement between the motor and motor support at an optimal angle and position.

The outboard motor support device is designed to provide dynamic load support, static load support, and lateral stability. A motor cradle in the rear provides vertical and lateral support to the lower unit of the motor, such that the motor support absorbs various force vectors. Extended arms connect the motor cradle to a solid support base removably connected to the transom. The motor support supports the motor via a large area of contact.

BRIEF DESCRIPTION OF THE DRAWINGS

The above-mentioned and other features and advantages of this disclosure, and the manner of attaining them, will become more apparent and the disclosure itself will be better understood by reference to the following description of embodiments of the disclosure taken in conjunction with the accompanying drawings, wherein.

Figure 1:
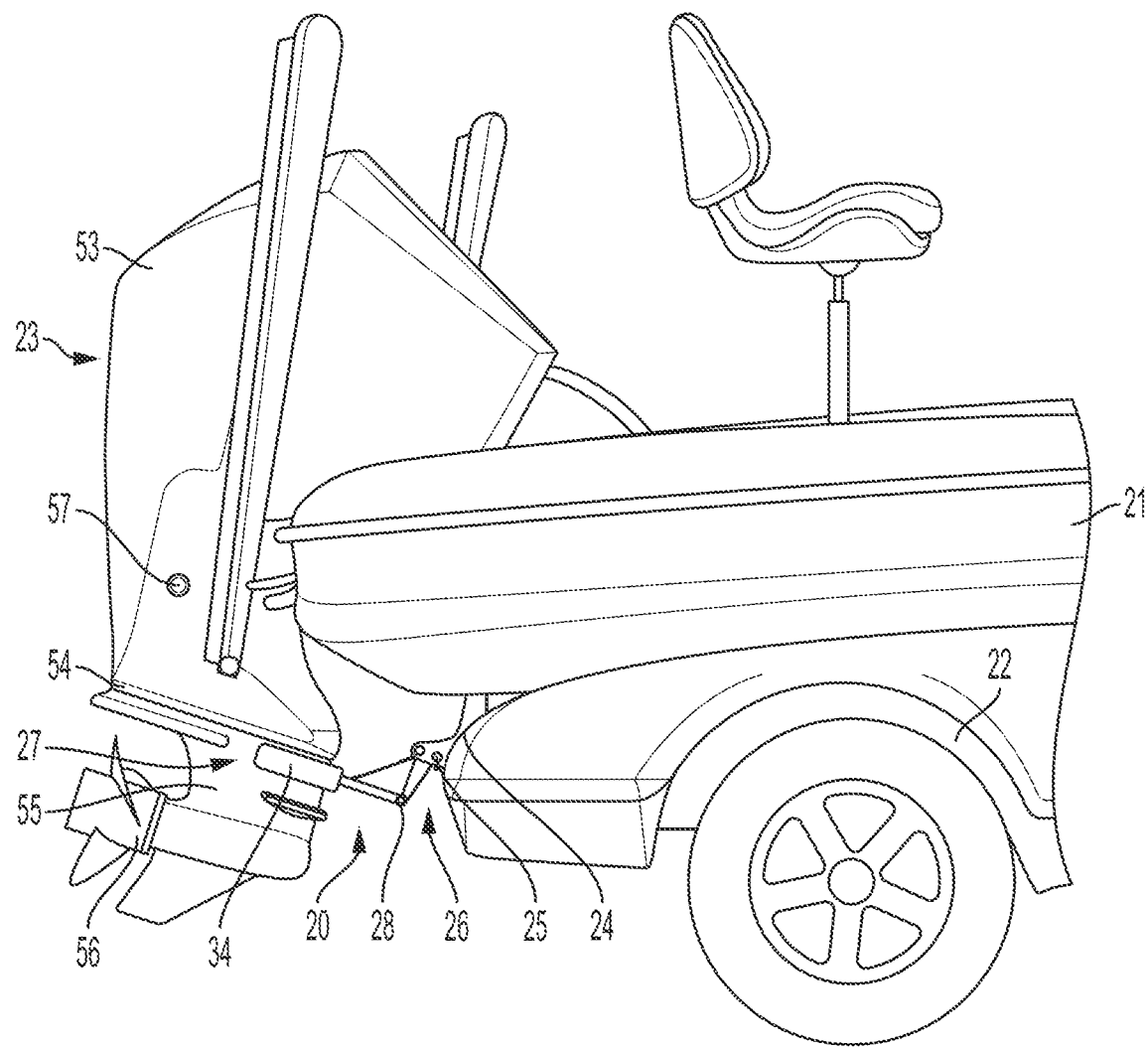
FIG. 1 is a side view of a stern of a boat mounted on a trailer, showing an outboard motor mounted to the transom and supported for trailering using an outboard motor support device made in accordance with the present disclosure.

Drawings are drawn to scale except as otherwise noted. Corresponding reference characters indicate corresponding parts throughout the several views. The exemplifications set out herein illustrates embodiments of the disclosure, the embodiments disclosed below are not intended to be exhaustive or to be construed as limiting the scope of the disclosure in any manner.

DETAILED DESCRIPTION

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates. One embodiment of the disclosure is shown in great detail, although it will be apparent to those skilled in the relevant art that some features that are not relevant to the present disclosure may not be shown for the sake of clarity.

Referring to FIG. 1, outboard motor support device 20 is shown for use in trailering the motor of a boat 21 on trailer 22. Motor 23 is mounted on the stern of boat 21 and is shown hydraulically trimmed to an appropriate pitch for trailering, as further described below. Transom 24 is fixed to the stern of boat 21 below the location of the pivotable coupling between motor 23 and boat 21. Transom 24 is a reinforced part of the stern of boat 21 and includes brackets with apertures 25 which are sized and configured to receive fasteners or pins, as best shown in FIGS. 10-14. As described below, outboard motor support device 20 is configured to releasably mount to transom 24 via the bracket apertures 25 at a front end portion, and to receive motor 23 at the opposing rear end portion. As described in further detail below, outboard motor support device 20 provides vertical, or gravitational, support as well as horizontal, or lateral, support to motor 23, which protect the motor and its associated structures from static dynamic forces during storage and transport, such as trailering.

Figure 2:
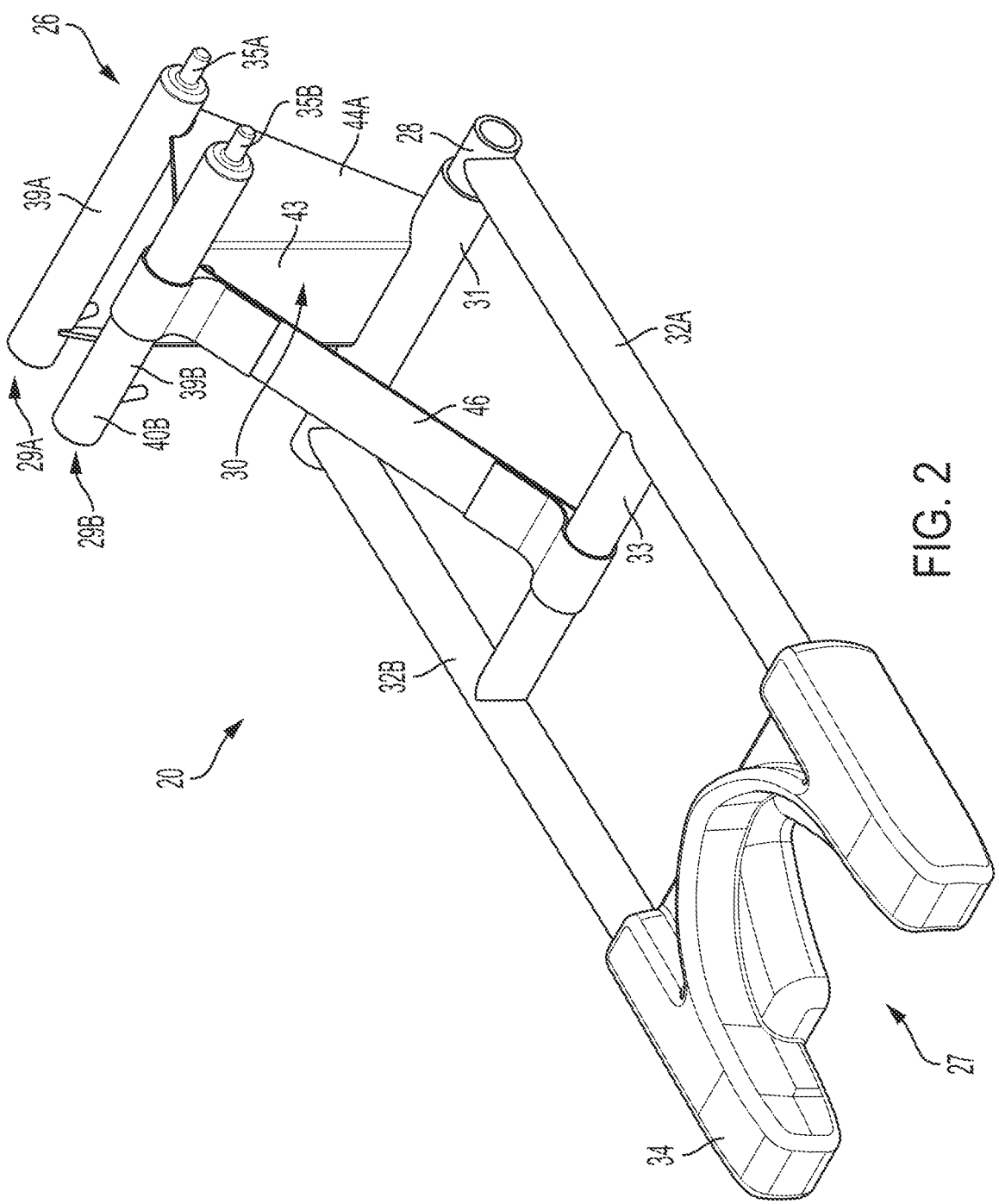
FIG. 2 is a perspective view of the outboard motor support device shown in FIG. 1.
Figure 3:
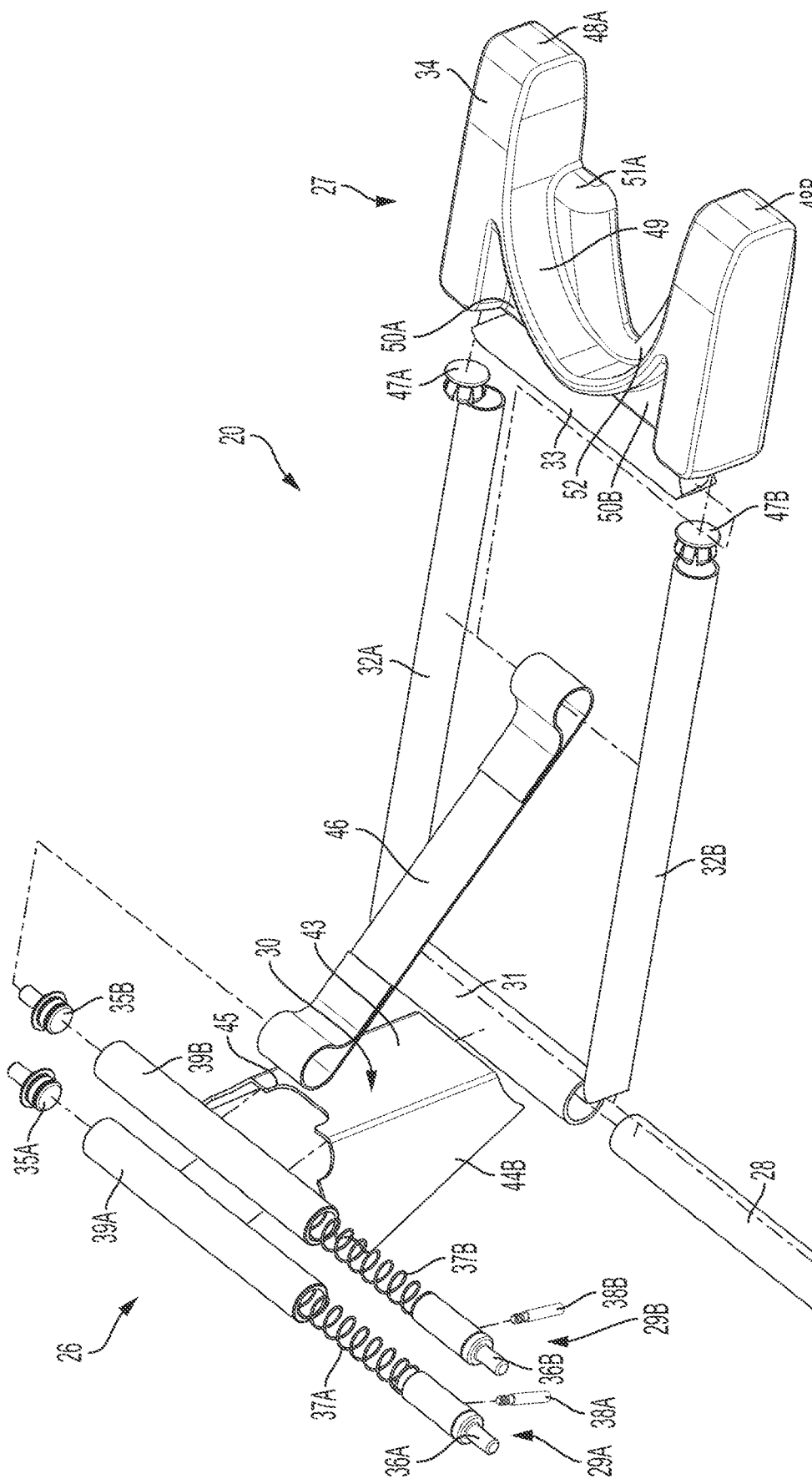
FIG. 3 is an exploded view of the outboard motor support device shown in FIG. 1.

As illustrated in FIGS. 2 and 3, outboard motor support device 20 includes a first end portion having a transom mount 26, an opposing second end having motor support 27, and pivot joint axle 28 therebetween. Transom mount 26 includes plunger pin mechanisms 29A and 29B and support gusset 30. A swivel joint, shown herein as pivot joint axle 28, is rotatably disposed within pivot joint housing 31. As best seen in FIG. 2, support gusset 30 is fixed to plunger pin mechanisms 29A and 29B at an upper end, and fixed to pivot joint housing 31 at its opposing lower end. In the illustrated embodiment, support gusset 30 is fixed to plunger pin mechanisms 29A and 29B and to pivot joint housing 31 via welding, though other suitable means of fixation may of course be used.

Motor support 27 includes motor support frame members 32A and 32B, cross brace 33, and motor cradle 34. In the illustrative embodiment of FIGS. 2 and 3, motor support frame members 32A and 32B are spaced laterally apart and extend parallel to one another rearwardly from pivot joint axle 28. Motor support frame members 32A and 32B are fixed to pivot joint axle 28 at their front ends, e.g., by welding. Cross brace 33 extends perpendicularly between motor support frame members 32A and 32B at a midpoint of their length and is mounted to each of motor support frame members 32A and 32B to provide structural rigidity and provide an anchor point for strap 46, as further described below. Motor cradle 34 is received over rear end portions of motor support frame members 32A and 32B, and provides a custom-fit motor interface as discussed further below.

Figure 8:
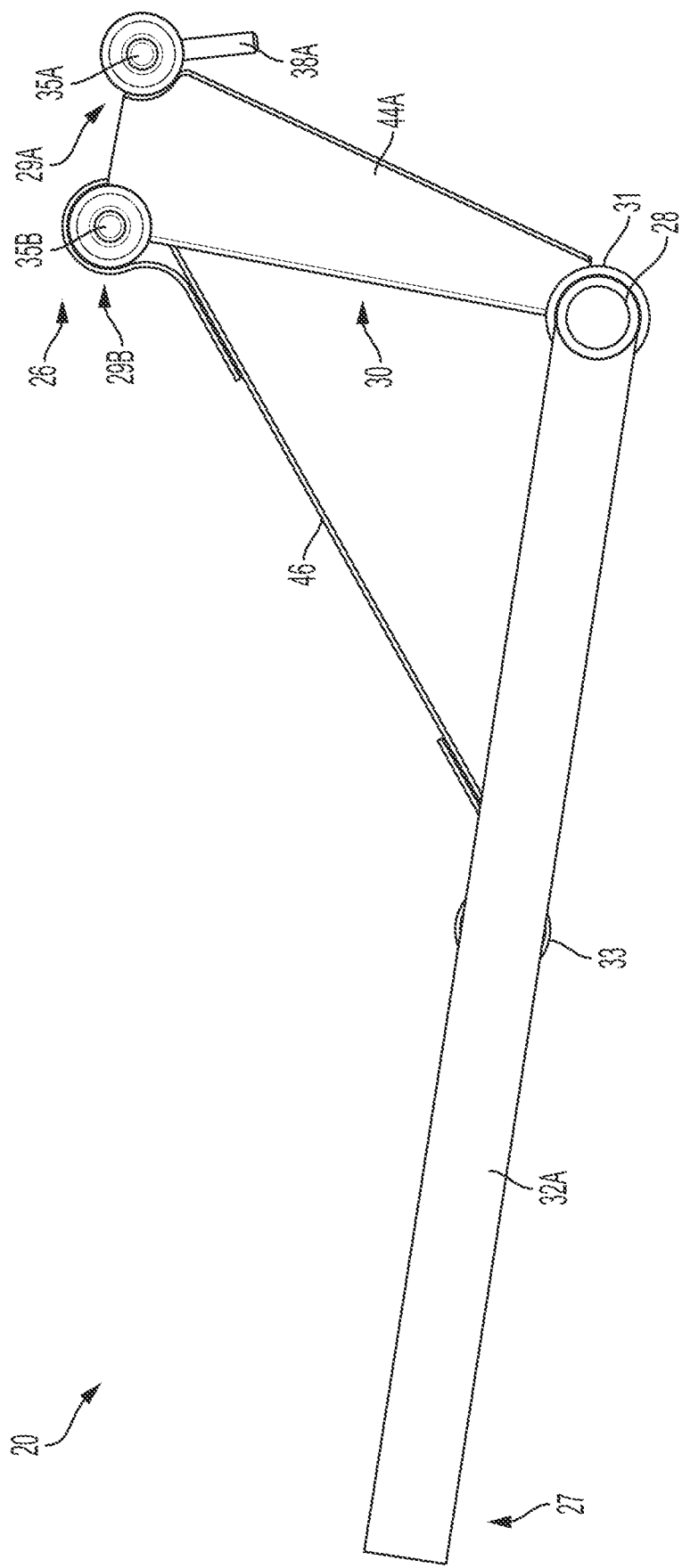
FIG. 8 is a side elevation view of a portion of the outboard motor support device shown in FIG. 1.

Referring still to FIGS. 2 and 3, transom mount 26 includes plunger pin mechanisms 29A and 29B and support gusset 30 to provide a connection mechanism configured for easily coupling motor support device 20 to transom 24 (FIG. 1). Motor support device 20 includes at least two plunger pin mechanisms 29A and 29B, as shown, though more such mechanisms may be used as required or desired for a particular application. As best illustrated in FIG. 8, plunger pin mechanism 29A is spaced forwardly from plunger pin mechanism 29B, and mechanisms 29A and 29B each define longitudinal axes that are substantially parallel to one another (e.g., within 1 degree of perfectly parallel) and oriented horizontally (i.e., substantially parallel to the ground) when device 20 is mounted to boat 21 as shown in FIG. 1. As shown in FIG. 2, a plane defined by the longitudinal axes of plunger pin mechanisms 29A and 29B is generally parallel to a plane defined by the longitudinal axes of support frame members 32A and 32B when coupling motor support device 20 is in an at-rest position (i.e., with strap 46 in tension as further described below).

As illustrated in FIG. 3, plunger pin mechanism 29A includes a fixed retainer pin 35A, a moveable pin 36A, a biasing element, such as spring 37A, and handle 38A, with each of these components partially or completely housed within plunger pin mechanism housing 39A. In the illustrative embodiment of FIG. 3, plunger pin mechanism housing 39A is a hollow tube which extends horizontally across the width of outboard motor support device 20, and is welded to gusset 30. Retainer pin 35A includes a plug which is sized to be fixed within plunger pin mechanism housing 39A, and a pin which protrudes outwardly from housing 39A. Fixed pin 35A may be fixed within plunger pin mechanism housing 39A, via welding or adhesive, or another other suitable fixation method.

Figure 4:
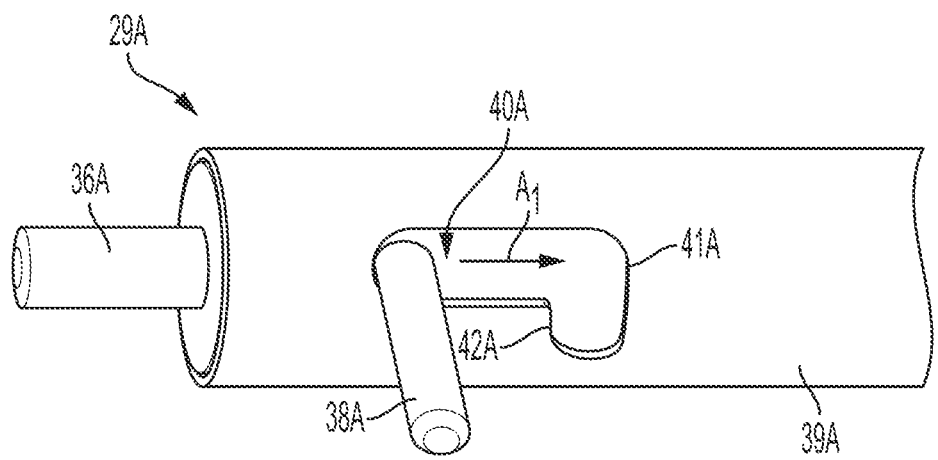
FIG. 4 is a perspective view of a portion of the outboard motor support device of FIG. 1, showing a plunger pin mechanism in an extended, engagement configuration.
Figure 5:
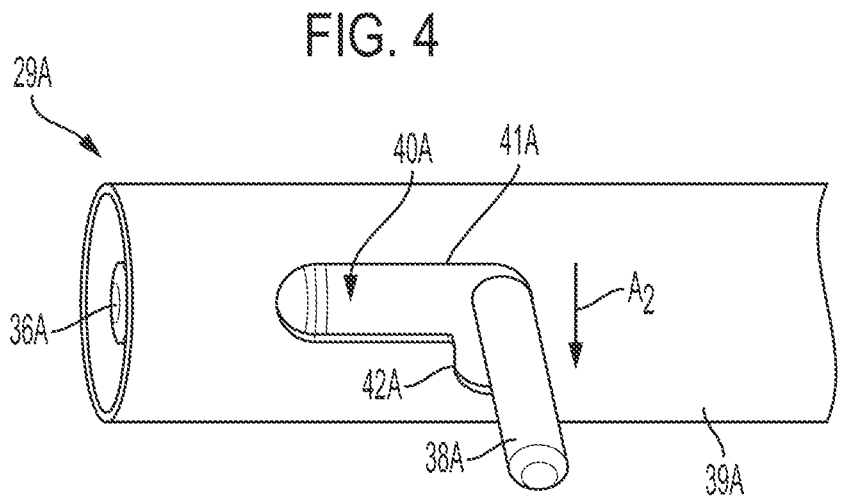
FIG. 5 is a perspective view of the portion of outboard motor support device of FIG. 4, showing the plunger pin mechanism in a retracted, unlocked configuration.
Figure 6:
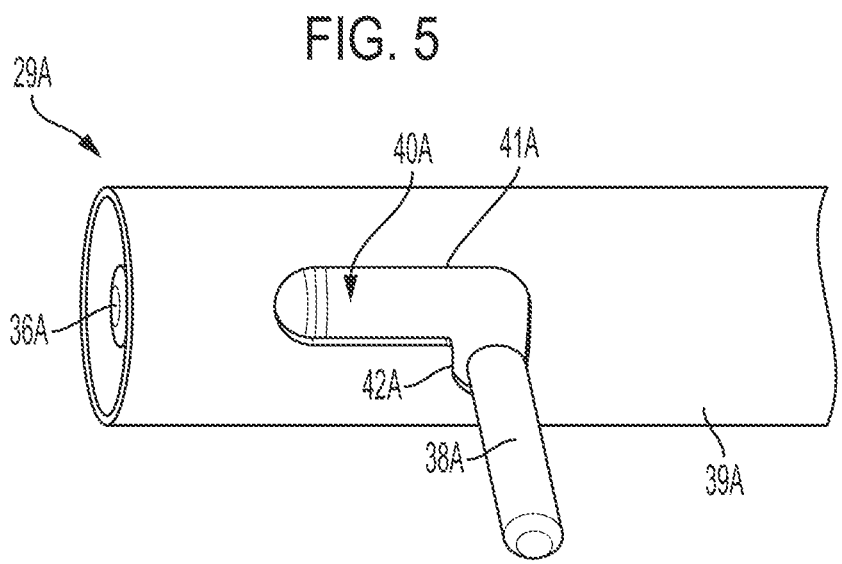
FIG. 6 is a perspective view of the portion of outboard motor support device of FIG. 4, showing the plunger-pin mechanism in retracted, locked configuration.

Referring still to FIG. 3, plunger pin mechanism 29A further includes spring 37A which is sized to extend between retainer pin 35A at one end and moveable pin 36A at its opposite end. Spring 37A is configured to bias moveable pin 36A away from fixed pin 35A. As best shown in FIGS. 4-6, plunger pin mechanism 29A also includes handle 38A, which cooperates with drive slot 40A to retain moveable pin 36A within a defined range of motion. Drive slot 40A is an L-shaped cutout in plunger pin mechanism housing 39A, including an axial translation portion 41A and a retention portion 42A. As shown by a comparison of FIGS. 4 and 5, moveable pin 36A is slidably disposed within plunger pin mechanism housing 39A, and handle 38A is mounted to moveable pin 36A by threaded engagement) and extends laterally outwardly through drive slot 40A.

Handle 38A is configured to allow a user to drive moveable pin 36A into plunger pin mechanism housing 39A. In particular and with reference to FIG. 4, the user may pull handle 38A against the biasing force of spring 37A (FIG. 3) to manually advance handle 38A through axial translation portion 41A of slot 40A in the direction of arrow $A_1$.

Once retracted, the user can advance handle 38A along the direction of arrow $A_2$ as shown in FIG. 5, which rotates moveable pin 36A and places handle 38A in retention portion 42A of slot 40A as shown in FIG. 6. This locks moveable pin 36A in the retracted position against the biasing force of spring 37A. As shown in FIG. 4, when handle 38A is disposed within axial translation portion 41A of drive slot 40A, spring 37A forces moveable pin 36A to extend out of plunger pin mechanism housing 39A. The position reflected in FIG. 4 is an extended or engagement configuration.

Accordingly, FIG. 5 illustrates plunger pin mechanism 29A after handle 38A has been fully retracted along arrow $A_1$ (FIG. 4) but before handle 38A has been rotated along arrow $A_2$ (FIG. 5). At this "transition configuration" of plunger pin mechanism 29A, moveable pin 36A is retracted into plunger pin mechanism housing 39A against the force of spring 37A, but will automatically extend back outwardly under the biasing force of spring 37A if handle 38A is released.

FIG. 6 illustrates plunger pin mechanism 29A after handle 38A has been rotated along arrow $A_2$ (FIG. 5) to place handle 38A into the locked position, such that plunger pin mechanism 29A is in its "retracted configuration." In this configuration, spring 37A is prevented from moving pin 36A outwardly to its extended configuration even if handle 38A is released.

Plunger pin mechanism 29B includes the same parts, function, and configurations as plunger pin mechanism 29A, with corresponding reference numbers having corresponding features and functions, except with "A" being replaced with "B." Plunger pin mechanism 29B will not be described in further detail, it being understood that the description of mechanism 29A herein applies equally to mechanism 29B.

Referring again to FIG. 3, support gusset 30 of transom mount 26 also includes upright panel 43 and side panels 44A and 44B. Upright panel 43 extends in a substantially vertical direction between pivot joint housing 31 and plunger pin housing 39B. Upright panel 43 of support gusset 30 includes slot 45 formed as a cut out at the top edge of upright panel 43. Slot 45 is sized and configured to allow strap 46 to wrap around plunger pin mechanism housing 39B and extend toward cross brace 33 (FIG. 2) without rubbing or touching upright panel 43.

Side panels 44A and 44B extend forward from upright panel 43. Side panels 44A and 44B extend vertically between pivot joint housing 31 and plunger pin mechanism housings 39A and 39B. The top edges of side panels 44A and 44B include rounded cutouts sized to receive the outer surfaces of housings 39A, 39B (e.g., to create a seam for a welded or adhesive connection). Likewise, the bottom edges of side panels 44A and 44B are shaped to receive the tubular pivot joint housing 31 (e.g., to create a seam for a welded or adhesive connection).

Support gusset 30 provides dispersion of forces applied on outboard motor support device 20 along two axes. Upright panel 43 extends along a lateral direction, and side panels 44A and 44B extend along a forward/rearward direction. This creates a box-like shape capable of absorbing and dispersing a multitude of forced generated during storage and transport of boat 21, such that outboard motor support device 20 can provide rigid support for vertical, horizontal and torsional force vectors.

As shown in FIG. 3, outboard motor support device 20 also includes a pivotable connection between transom mount 26 and motor support 27. This pivot connection includes pivot joint axle 28 and housing 31, the frame subassembly including motor support frame members 32A, 32B and cross brace 33, and strap 46.

Figure 7:
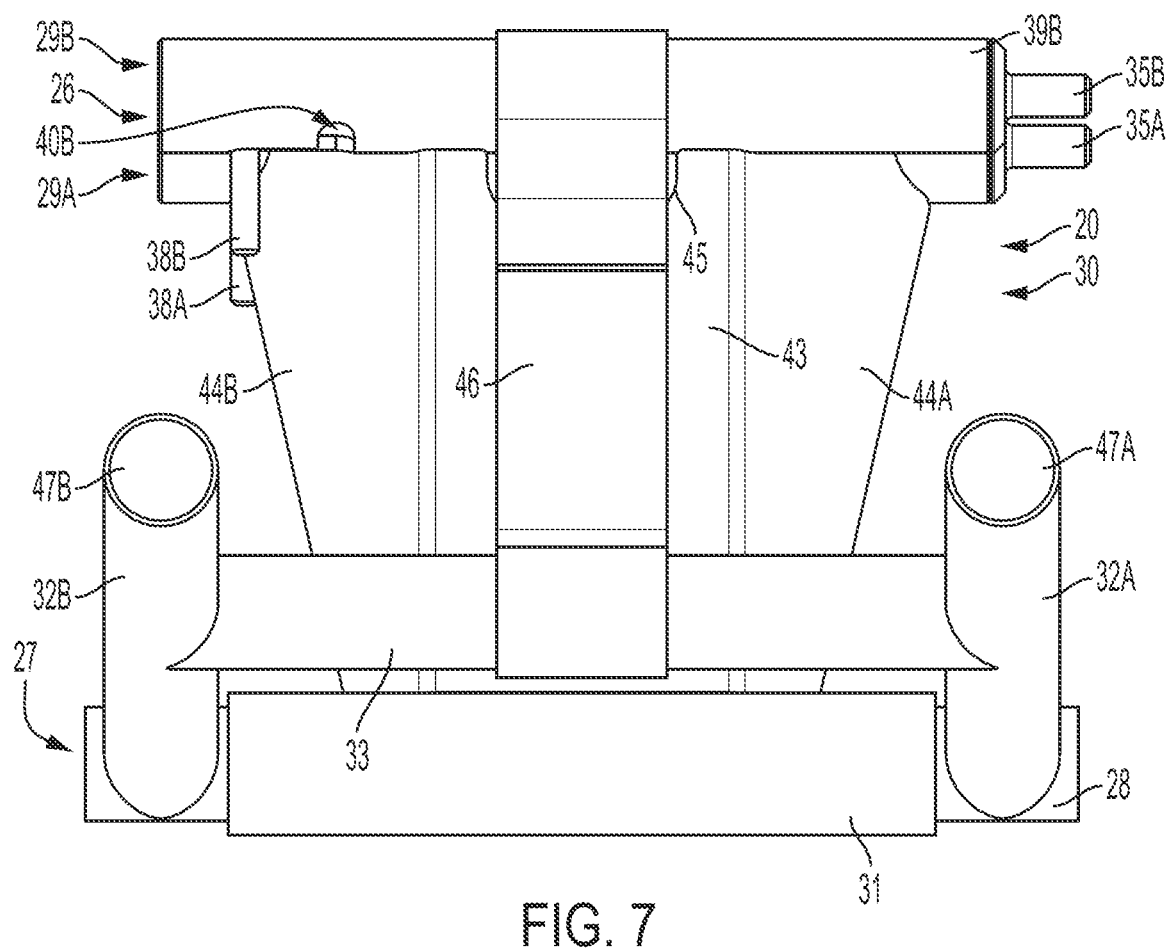
FIG. 7 is a front elevation view of a portion of the outboard motor support device shown in FIG. 1.

Pivot joint housing 31 is fixed to support gusset 30, such as by welding as described above. Pivot joint axle 28 is rotatably received within pivot joint housing 31. Pivot joint axle 28 and pivot joint housing 31 together define a pivot axis, which, as illustrated in FIG. 2, is substantially perpendicular to the longitudinal axes of frame members 32A, 32B and of the overall outboard motor support device 20. As best seen in FIG. 7, pivot joint axle 28 extends outwardly from pivot joint housing 31 sufficiently to allow fixation of motor support frame members 32A and 32B thereto which, as shown in FIG. 2, are disposed outwardly from the ends of pivot joint housing 31. In this way, the frame assembly including axle 28, frame members 32A, 32B and cross brace 33 is pivotable as a single unit relative to transom mount 26. As shown in FIG. 3, caps 47A and 47B are sealingly fitted within the open ends of support frame members 32A and 32B.

As illustrated in FIG. 2, strap 46 is secured to plunger pin mechanism housing 39B at a first end and to cross brace 33 at an opposing second end. The ends of strap 46 are configured to wrap around and secure to plunger pin mechanism housing 39B and cross brace 33 via a sewn connection, rivets, or other fixing means, or optionally by an adjustable connection such as hook-and-loop fasteners or snaps, for example. Alternatively, one end of strap 46 may be permanently secured around either plunger pin mechanism housing 39B or cross brace 33, and opposite end may be adjustably connected. Yet another option is to include length adjustability in the middle of strap 46. Strap 46 is configured to suspend motor cradle 34 of outboard motor support device 20 in a desired rotational position and to prevent motor cradle 34 from sliding down the lower unit of the motor during use, as described further below.

As shown in FIG. 3, outboard motor support device 20 also includes a generally U-shaped motor cradle 34, which may be a molded component made from an elastomeric material, for example, to prevent motor support from scratching or marring the lower unit of a motor. Motor cradle 34 is coupled to outboard motor support device 20 by sliding ends of motor support frame members 32A and 32B within correspondingly formed bores molded within motor cradle 34. In an exemplary embodiment, the elastomeric material of motor cradle 34 is firm enough to support the outboard motor 23 during trailering and with significant deformation, but also pliable enough to cradle outboard motor 23 without risk of scratching or marring the surfaces of motor 23. In an exemplary embodiment, motor cradle 34 is made from an elastomeric material, such as a rubber material, or a synthetic material such as urethane or another thermoplastic. The material of motor cradle 34 may have a hardness value ranging from 40 Shore D, 45 Shore D, or 50 Shore D to 75 Shore D, 80 Shore D, or 85 Shore D, or any other range using any two of the foregoing values as endpoints.

Figure 9A:
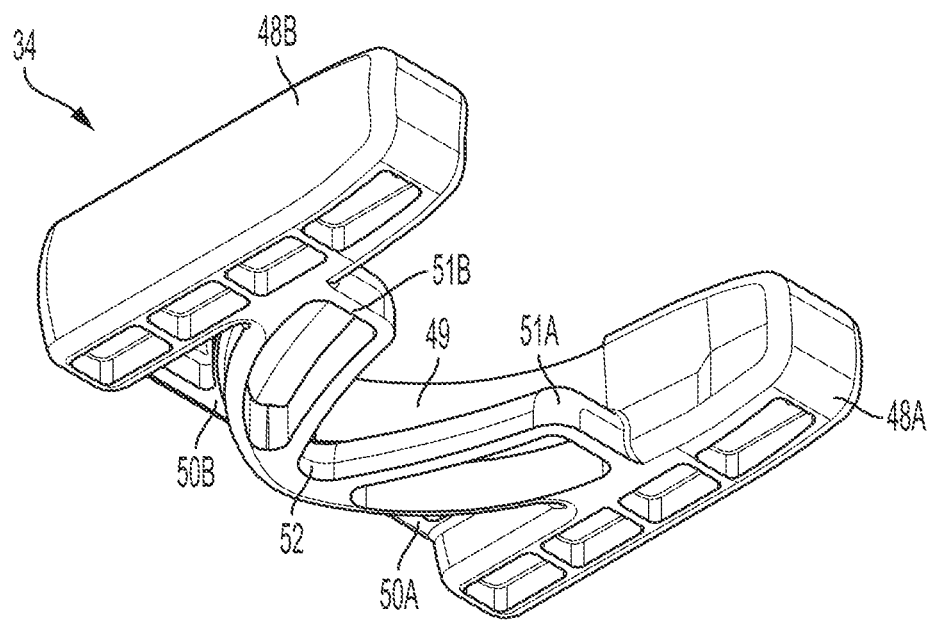
FIG. 9A is a bottom perspective view of the motor support of the outboard motor support device shown in FIG. 1.
Figure 9B:
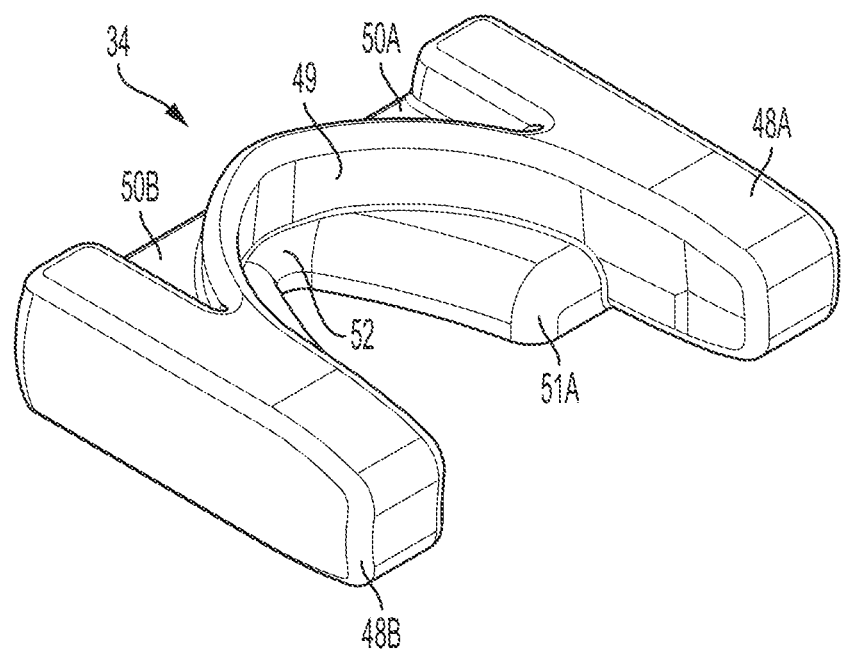
FIG. 9B is a top perspective view of the motor support of FIG. 9A.
Figure 9C:
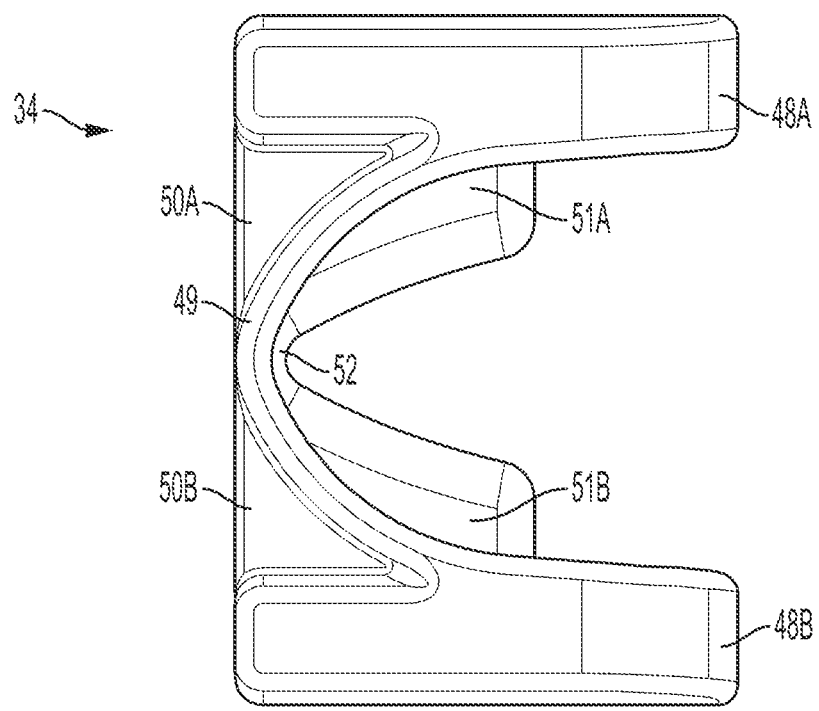
FIG. 9C is a top plan view of the motor support of FIG. 9A.
Figure 9D:
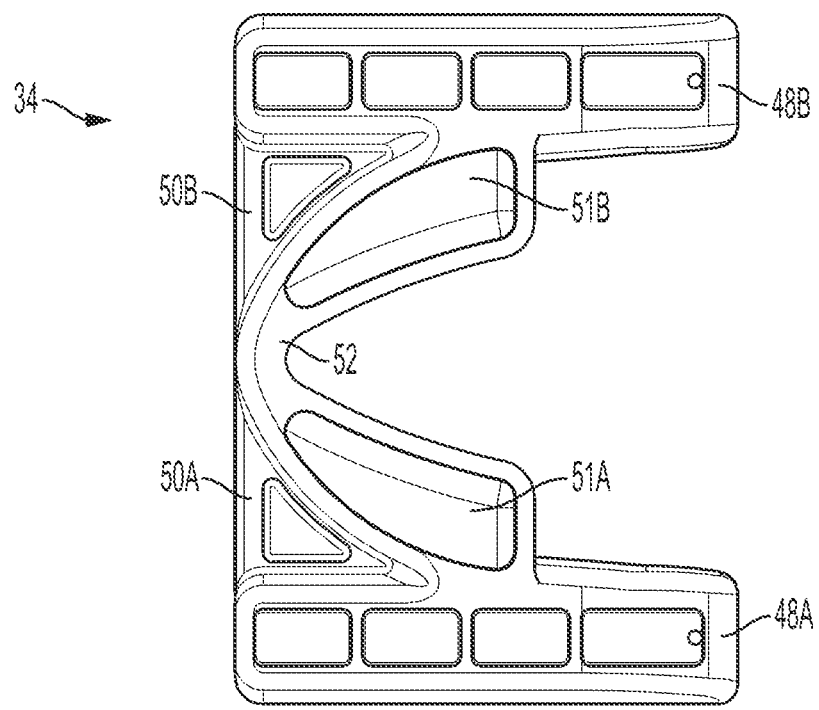
FIG. 9D is bottom plan view of the motor support of FIG. 9A.

As best seen in FIGS. 9A and 9B, motor cradle 34 includes arms 48A and 48B, collar 49, ribs 50A and 50B, shoulders 51A and 51B, and arch 52. Although other embodiments and structural features are envisioned, the present embodiment of motor cradle 34 and its components are shaped and configured to receive portions of the lower unit of a Mercury ProXS 250 Four Stroke Motor, manufactured by Mercury Marine, a division of Brunswick Corporation. However, the geometric configuration of motor cradle 34 may be tailored to receive and support the particular lower unit geometry of other outboard motors using the same general principles described herein with respect to cradle 34.

As shown in FIG. 1, most outboard motors, including motor 23 depicted herein, include a powerhead 53 including an internal combustion engine covered by a cowl, a midsection including a trim switch 57 mounted thereon, and a lower unit 55 including an anti-cavitation plate 54, prop 56, and associated structures. Powerhead 53 is the largest portion of motor 23 and houses the inner mechanics of motor 23. Cavitation plate 54 is an outwardly extending flange below the powerhead 53 and forms a visual delineation between the large dimensions of powerhead 53 and the much more slender lower unit 55. Lower unit 55 has a smaller width and overall profile than powerhead 53 and extends vertically down from powerhead 53 and includes mechanical driveline components which transmit power from powerhead 53 to prop 56 to propel boat 21 during use. Trim switch 57 is disposed on powerhead 53 and is a button, series of buttons, or toggle switch which is configured to hydraulically adjust the pitch of motor 23.

As illustrated in FIGS. 9A-9D, motor cradle 34 includes arms 48A and 48B laterally spaced apart from one another and generally parallel to one another. Arms 48A, 48B are joined to one another by collar 49 and ribs 50A and 50B to form a single unitary piece of material. Shoulders 51A 51B, and arch 52 are disposed between arms 48A and 48B and extend inwardly from arms 48A and 48B respectively. Shoulders 51A, 51B, and arch 52 thereby form a second, inwardly-spaced U-shaped profile which defines a space sized to receive a portion of lower unit 55 of motor 23. Arms 48A and 48B include cavities or bores (not shown) which extend partially along the length of arms 48A and 48B and are sized to receive frame members 32A, 32B.

Arms 48A and 48B are laterally (i.e., horizontally) spaced apart sufficiently to extend around either side of lower unit 55, below cavitation plate 54, to cradle the side surfaces of the lower unit 55 and prevent lateral movement during trailering. As shown in FIG. 9B, collar 49 is a raised, curved portion which spans the lateral distance between, and matches the height of arms 48A and 48B. Collar 49 is configured to receive the radiused portion of the lower unit leading up toward cavitation plate 54 as outboard motor 23 is moved into the supported position engaged by motor cradle 34. That is, collar 49 engages and abuttingly supports the leading edge of the lower unit 55 of outboard motor 23, without allowing the lower surface of cavitation plate 54 to come into contact with the adjacent upper surfaces of arms 48A and 48B. This prevents any scuffing or other adverse contact between motor support 27 and cavitation plate 54.

Ribs 50A and 50B are substantially thinner in cross-section as compared to arms 48A and 48B, but connect the rear portions of arms 48A and 48B to the rear portion of collar 49 and are configured to provide rigidity, support dynamic loads, and absorb the weight of the outboard motor 23.

Shoulders 51A and 51B and arch 52 also extend inwardly of arms 48A and 48B and collar 49. Shoulders 51A and 51B are substantially thinner than arms 48A and 48B, but substantially thicker than ribs 50A and 50B. Shoulders 51A and 51B are shaped to match the shape of lower unit 55 to further engage its surfaces and and support the static and dynamic loads from motor 23.

Figure 10:
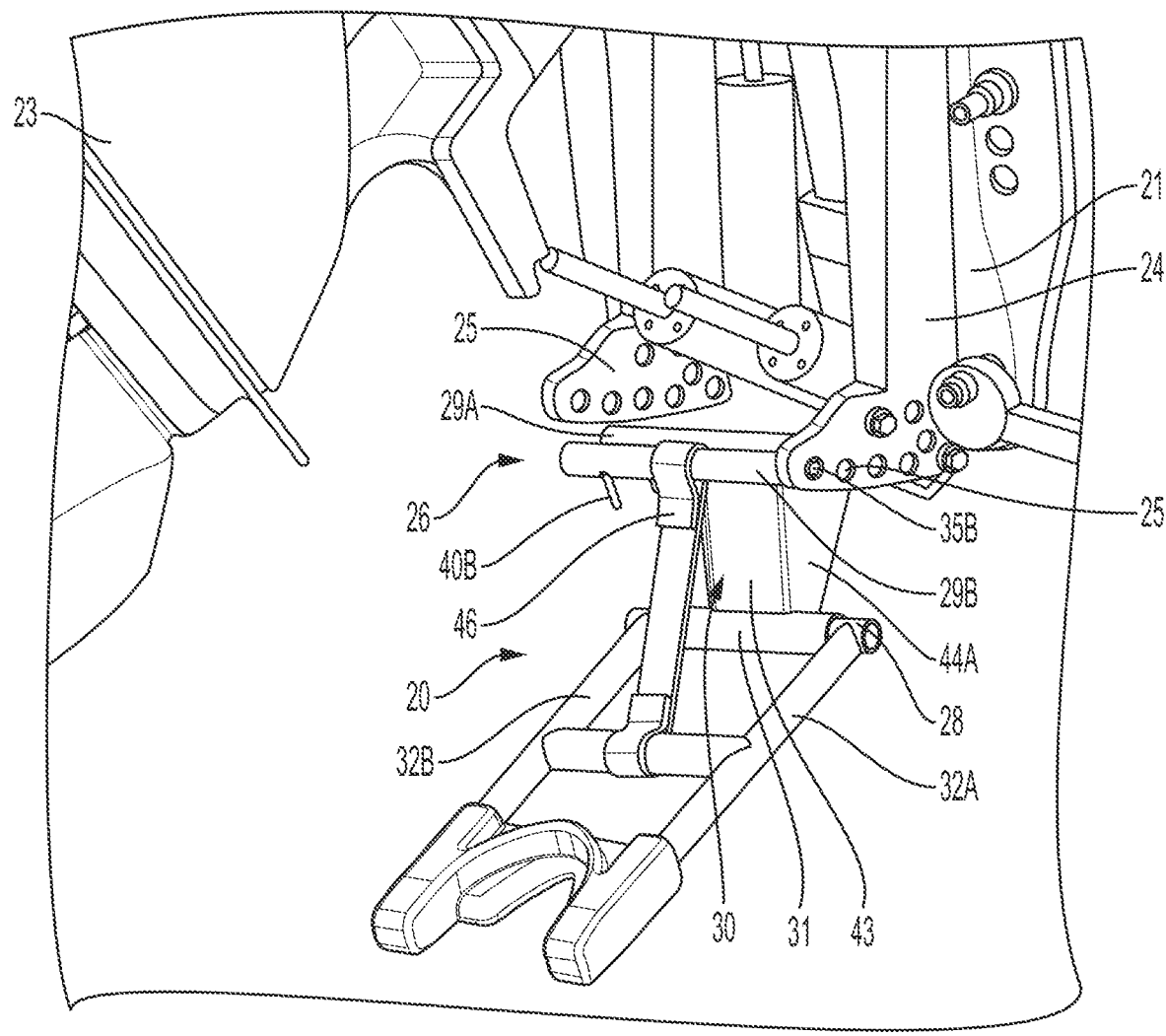
FIG. 10 is a perspective view of a first step in mounting of the outboard motor support device of FIG. 1.

Turning now to FIGS. 10-14, a series of steps are shown depicting the use of outboard motor support device 20 in connection with supporting the motor 23 of boat 21 (FIG. 1). FIG. 10 illustrates a first step, in which outboard motor support device 20 is mounted to transom 24. After retrieving motor support device 20, the operator pulls handles 38A and 38B back (e.g., along arrow $A_1$ as shown in FIG. 4), then rotates the handles 38A and 38B down (e.g., along arrow $A_2$ of FIG. 5) into portions 42A and 42B of slots 40A, 40B respectively. This retracts and retains moveable pins 36A and 36B in their retracted configurations. With pins 36A and 36B retracted, clearance is provided to allow plunger pin mechanisms 29A and 29B to be placed between the transom brackets. Initially, the operator inserts fixed pins 35A and 35B into correspondingly spaced apertures 25 of the transom bracket 24 to orient and initially position motor support device 20 with respect to transom 24.

Figure 11:
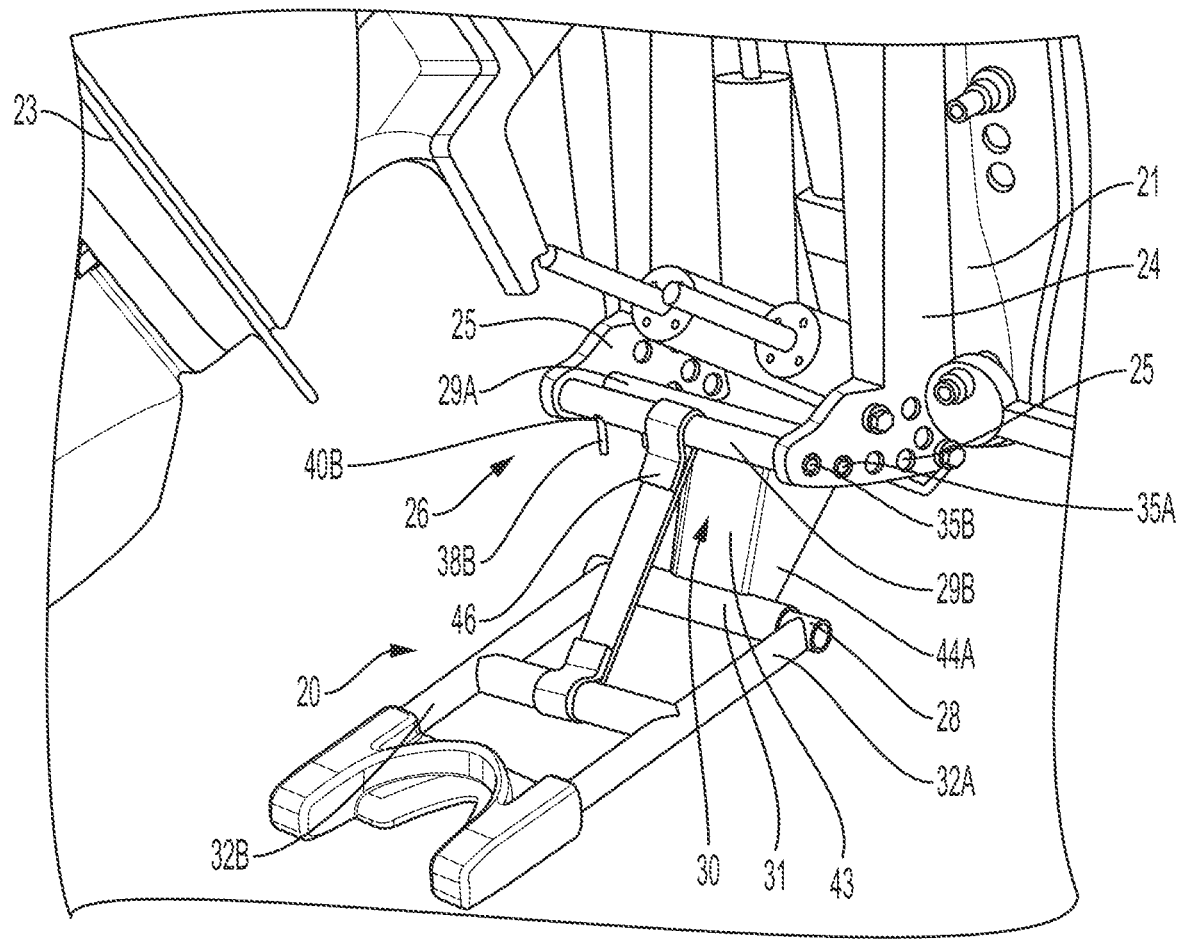
FIG. 11 is a perspective view of a second step in mounting of the outboard motor support device of FIG. 1.

Turning to FIG. 11, a second step in the mounting of outboard motor support device 20 to transom 24 illustrated in which, with continued insertion of fixed pins 35A and 35B into apertures 25 of the transom brackets, motor support device 20 is positioned to align moveable pins 36A and 36B with apertures 25 in the opposite bracket of transom 24.

Figure 12:
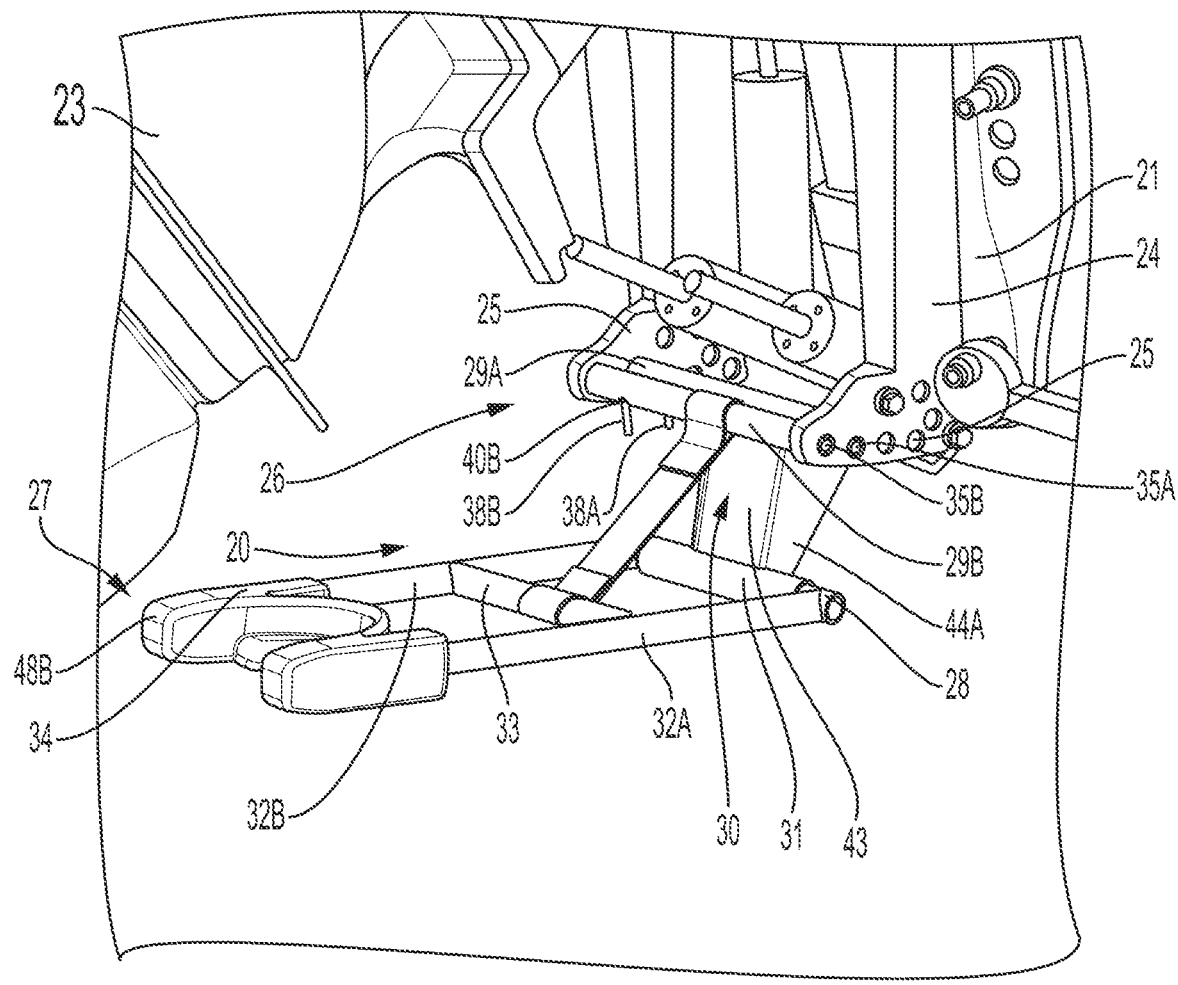
FIG. 12 is a perspective view of a third step in mounting of the outboard motor support device of FIG. 1.

In the assembly step illustrated in FIG. 12, user moves each of handles 38A and 38B back into the transition configuration (FIG. 5) such that moveable pins 36A and 36B are allowed to extend outwardly under the biasing force of springs 37A and 37B respectively (FIG. 3). This allows plunger pin mechanisms 29A and 29B to transition back into their locked configuration. In such locked configuration, moveable pins 36A and 36B pass into apertures 25 of transom 24, locking transom mount 26 into transom 24. At this point, motor support device 20 is fixed to boat 21 and strap 46 may be used to hold motor support 27 in place at a generally horizontal or slightly upwardly turned configuration, without any input from the operator.

Figure 13:
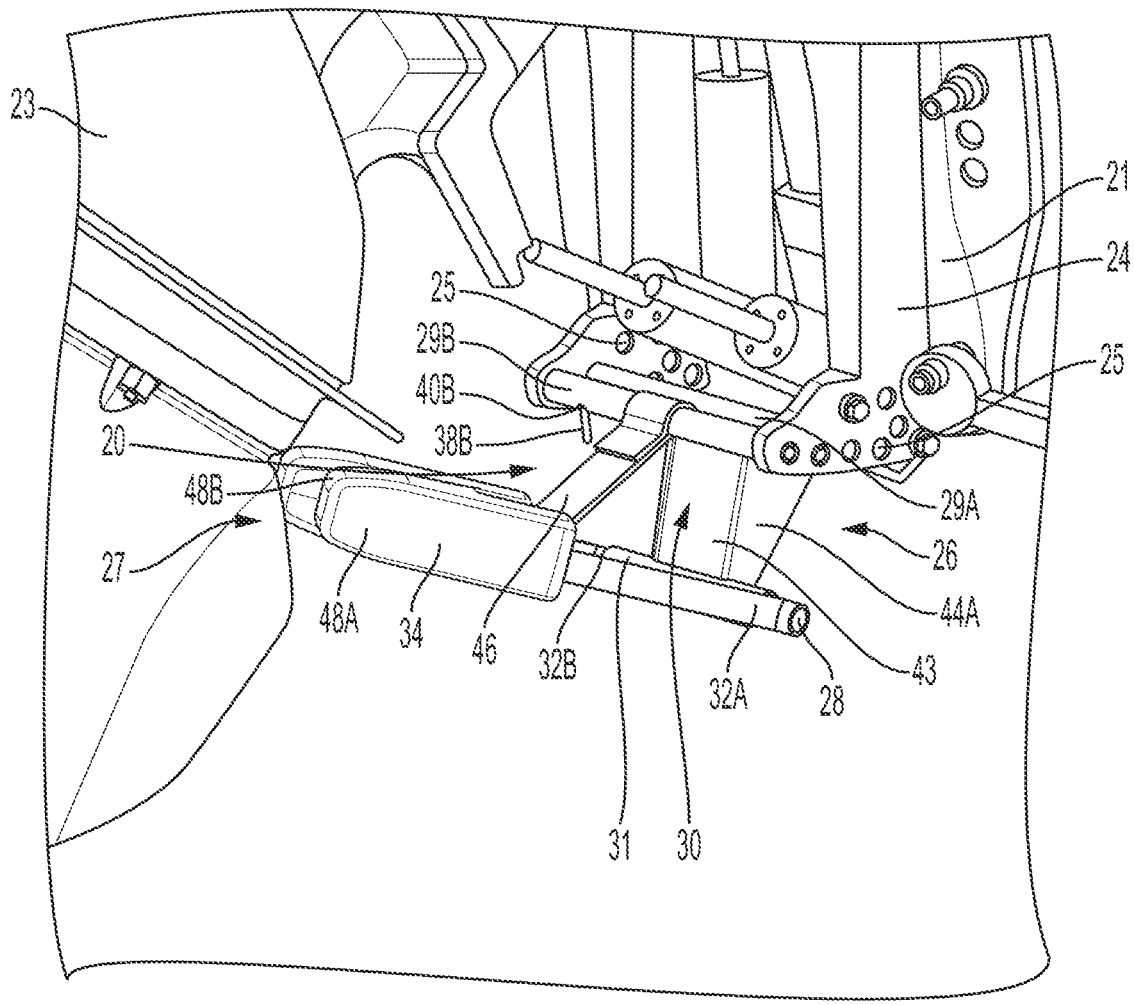
FIG. 13 is a perspective view of a fourth step in mounting of the outboard motor support device of FIG. 1.

In the assembly step illustrated in FIG. 13, the operator lifts up motor support 27 of outboard motor support device 20 to position motor cradle 34 at a desired angle to receive outboard motor 23. Advantageously, this can be done with one hand of the operator manipulating motor support 27, while the other hand is free to operate trim switch 57.

Figure 14:
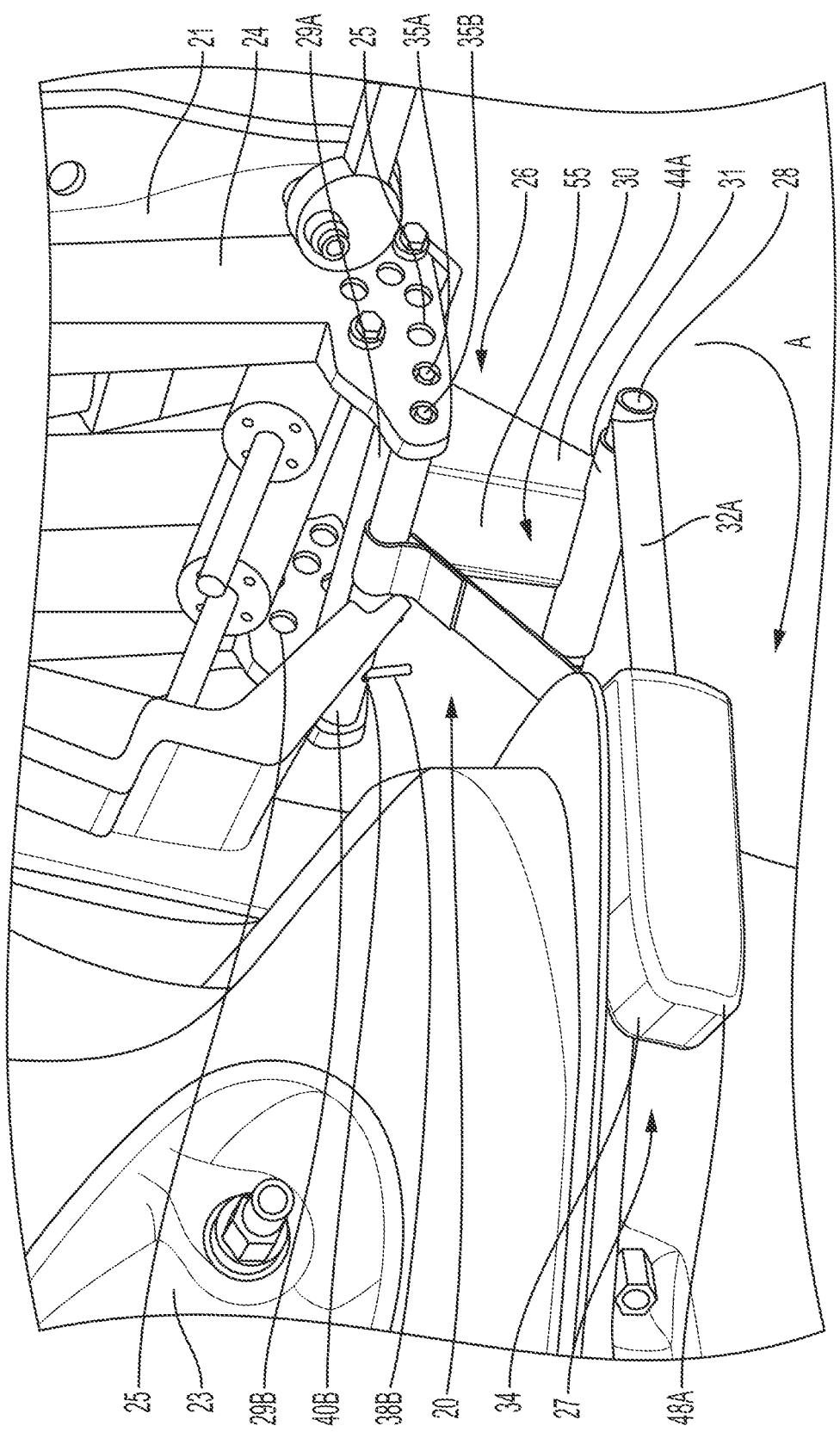
FIG. 14 is a perspective view of a final step in mounting of the outboard motor support device of FIG. 1.

As shown in FIG. 14, the operator then uses his or her free hand to lower outboard motor 23 into motor cradle 34, such as by actuating trim switch 57, while still holding motor support 27 up with the other hand. In this way, the operator can ensure a perfect alignment of lower unit 55 of motor 23 and the corresponding features of motor cradle 34, making any necessary fine adjustments as the motor lowers into engagement with motor cradle 34. Once the weight of outboard motor 23 nests within arms 48A and 48B, collar 49, and shoulders 51A and 51B, and holds outboard motor support device 20 in place, the installation is complete.

To remove motor support device 20, the foregoing steps are performed in reverse. That is, the operator may use trim switch 57 to raise motor 23 upwardly and clear of motor cradle 34, optionally holding support 27 to support its weight as it is disengaged by the motor. Handles 38A and 38B may then be retracted against the biasing force of springs 37A and 37B to withdraw moveable pins 36A and 36B from apertures 25, and transom mount 26 may be disconnected from transom 24 by withdrawing fixed pins 35A, 35B from their apertures 25. Motor support device 20 may then be lifted free and stowed for its next use.

Advantageously, motor support device 20 provides highly robust, non-marring support to heavy motors, such as motor 23, while also being easy to use. The support provides not only protection from the effects of "bouncing" forces typically associated with the weight on motor 23 as it is trailered, but also other, less predictable dynamic forces such as lateral and torsional forces. Motor support device 20 also advantageously performs these functions as a single unit which can be purchased, used and stowed more easily as compared to multiple-part devices.

While this disclosure has been described as having exemplary designs, the present disclosure may be further modified with the spirit and scope of this disclosure. Further, this application is intended to cover such departures from the present disclosure as come within known or customary practice in the art to which this disclosure pertains.

What is claimed is:

1. An outboard motor support device, comprising:
    a first end including a transom mount for releasable connection to a motor transom bracket;
    a second end opposite the first end and including a motor support comprising:
        first and second arms laterally separated and extending parallel to one another;
        a collar extending between and coupled to the first and second arms, the collar and first and second arms unitarily formed with one another and including first and second shoulders, the motor support engageable with a leading edge of a motor lower unit adjacent a cavitation plate of the lower unit to vertically and laterally support the lower unit;
    the first and second ends connected by frame members extending along a central axis; and
    a pivot joint including a pivot axle disposed perpendicular to the central axis of the frame members.

2. The outboard motor support device of claim 1, wherein the transom mount further includes at least one plunger pin mechanism.

3. The outboard motor support device of claim 2, wherein the at least one plunger pin mechanism includes a pin biased towards an extended position via a resilient member.

4. The outboard motor support device of claim 3, wherein the at least one plunger pin mechanism is manually translatable between retracted and extended positions.

5. The outboard motor support device of claim 1, wherein the first shoulder extends inwardly of the first arm and the second shoulder extends inwardly of the second arm.

6. The outboard motor support device of claim 5, wherein the motor support further includes an arch coupled to the first and second shoulders and to the collar.

7. The outboard motor support device of claim 6, wherein the first shoulder, the second shoulder, and the arch define a second generally U-shaped profile.

8. The outboard motor support device of claim 7, wherein the motor support is comprised of an elastomeric material.

9. A method of securing an outboard motor in a trailering position with a motor support device, comprising:
    providing the outboard motor support device of claim 1;
    connecting the first end of the motor support device to a transom of a boat;
    raising the second, motor support end of the motor support device about the pivot joint; and
    lowering the outboard motor to nest within a portion of the second, motor support end of the motor support device.

10. The method of claim 9, wherein the connecting step further comprises:
    inserting a first pin on a first side of the first end of the motor support device into a first aperture of a first bracket of the transom; and
    extending a second pin from a second side of the first end of the motor support device into a first aperture of a second bracket of the transom.

11. The method of claim 10, wherein the connecting step further comprises:
    inserting a third pin on the first side of the first end of the motor support device into a second aperture of the first bracket of the transom; and
    extending a fourth pin from the second side of the first end of the motor support device into a second aperture of the second bracket of the transom.

12. The method of claim 9, wherein the lowering step further comprises:
    adjusting a trim of the motor via a trim adjustment switch located on the motor.

13. An outboard motor support device, comprising:
    a first end including a transom mount for releasable connection to a motor transom bracket;
    a second end opposite the first end and including a motor support comprising:
        first and second arms laterally separated and extending parallel to one another;
        a collar extending between and coupled to the first and second arms, the collar and first and second arms including first and second shoulders, the motor support engageable with a leading edge of a motor lower unit adjacent a cavitation plate of the lower unit to vertically and laterally support the lower unit;
    the first and second ends connected by frame members extending along a central axis;
    a pivot joint including a pivot axle disposed perpendicular to the central axis of the frame members; and
    wherein the transom mount further includes two plunger pin mechanisms disposed parallel to one another.

14. A method of securing an outboard motor in a trailering position with a motor support device, comprising:
    providing the outboard motor support device of claim 13;
    connecting the first end of the motor support device to a transom of a boat;
    raising the second, motor support end of the motor support device about the pivot joint; and
    lowering the outboard motor to nest within a portion of the second, motor support end of the motor support device.

15. An outboard motor support device, comprising:
a first end including a transom mount for releasable connection to a motor transom bracket;
a second end opposite the first end and including a motor support comprising:
first and second arms laterally separated and extending parallel to one another;
a collar extending between and coupled to the first and second arms, the collar and first and second arms including first and second shoulders, the motor support engageable with a leading edge of a motor lower unit adjacent a cavitation plate of the lower unit to vertically and laterally support the lower unit;
the first and second ends connected by frame members extending along a central axis;
a pivot joint including a pivot axle disposed perpendicular to the central axis of the frame members; and
wherein the transom mount further comprises:
at least one plunger pin mechanism disposed on a first side of the transom mount and including a pin movable between retracted and extended positions; and
at least one fixed pin disposed on a second, opposite side of the transom mount.

16. The outboard motor support device of claim 15, wherein the transom mount further comprises:
a pair of plunger pin mechanisms disposed on a first side of the transom mount, each including a pin movable between retracted and extended positions; and
at least one fixed pin disposed on a second, opposite side of the transom mount.

17. The outboard motor support device of claim 15, wherein the transom mount further comprises:
at least one plunger pin mechanism disposed on a first side of the transom mount and including a pin movable between retracted and extended positions; and
a pair of fixed pins disposed on a second, opposite side of the transom mount.

18. A method of securing an outboard motor in a trailering position with a motor support device, comprising:
providing the outboard motor support device of claim 15;
connecting the first end of the motor support device to a transom of a boat;
raising the second, motor support end of the motor support device about the pivot joint; and
lowering the outboard motor to nest within a portion of the second, motor support end of the motor support device.

19. An outboard motor support device, comprising:
a first end including a transom mount for releasable connection to a motor transom bracket;
a second end opposite the first end and including a motor support comprising:
first and second arms laterally separated and extending parallel to one another;
a collar extending between and coupled to the first and second arms, the collar and first and second arms including first and second shoulders, the motor support engageable with a leading edge of a motor lower unit adjacent a cavitation plate of the lower unit to vertically and laterally support the lower unit;
the first and second ends connected by frame members extending along a central axis;
a pivot joint including a pivot axle disposed perpendicular to the central axis of the frame members; and
wherein the motor support comprises an elastomeric material having a hardness from 70 Shore D to 85 Shore D.

20. A method of securing an outboard motor in a trailering position with a motor support device, comprising:
providing the outboard motor support device of claim 19;
connecting the first end of the motor support device to a transom of a boat;
raising the second, motor support end of the motor support device about the pivot joint; and
lowering the outboard motor to nest within a portion of the second, motor support end of the motor support device.

* * * * *